United States Patent
Kato et al.

[11] Patent Number: 5,963,661
[45] Date of Patent: Oct. 5, 1999

[54] METHOD OF DETECTING PARTICLE-LIKE POINT IN AN IMAGE

[75] Inventors: Haruo Kato; Kazuyuki Maruo, both of Tokyo, Japan

[73] Assignee: Advantest Corporation, Tokyo, Japan

[21] Appl. No.: 08/987,257

[22] Filed: Dec. 9, 1997

[30] Foreign Application Priority Data

Dec. 9, 1996 [JP] Japan ................................. 8-328414

[51] Int. Cl.⁶ .................................................... G06K 9/00
[52] U.S. Cl. ................................................ 382/149; 348/126
[58] Field of Search .................................. 382/149, 151, 382/145, 201, 203, 194, 199, 280; 348/125, 126, 131; 438/7

[56] References Cited

U.S. PATENT DOCUMENTS 5,229,304  7/1993  Chang et al. ............................... 438/7
5,311,598  5/1994  Bose et al. ................................ 382/149

*Primary Examiner*—Joseph Mancuso
*Assistant Examiner*—Vikkram Bali
*Attorney, Agent, or Firm*—Knobbe, Martens, Olson & Bear, LLP

[57] ABSTRACT

A particle-like point in an image is detected to detect a defect by directly processing an image of an object to be inspected. The image is first binarized, and the binarized image is scanned along an X-axis or a Y-axis, and a particle-like point in the image is approximated by a rectangular area. Information representative of the coordinates of the center of the rectangular area and the size of the rectangular area is outputted as information of the detected particle-like point.

4 Claims, 8 Drawing Sheets

METHOD OF DETECTING PARTICLE-LIKE POINT IN AN IMAGE

BACKGROUND OF THE INVENTION

1. Field of the Invention

The present invention relates to a method of processing image data, and more particularly to a method of processing image data to detect and recognize a defect produced or foreign matter mixed in a process of fabricating a printed circuit board, a semiconductor wafer, or the like.

2. Description of the Related Art

Defects produced or foreign matter mixed in a process of fabricating a printed circuit board, a semiconductor wafer, or the like are responsible for defective final products. Therefore, such defects and foreign matter should be detected as soon as they are produced or mixed.

There have heretofore been many various image processing methods of detecting, recognizing, or judging defects or foreign matter contained in a printed circuit board or a semiconductor wafer based on a photograph thereof or an image thereof which has been captured by an SEM (Scanning Electron Microscope). Most of these image processing methods process image data digitally with a computer.

Conventional image processing for the detection of defects has mainly relied upon the technique of pattern matching. According to the conventional image processing, an image of an object to be inspected is compared with an image of a printed circuit board or a semiconductor wafer that is free of any defects (hereinafter referred to as a "golden device"). Specifically, the image comparison means the generation of a differential image between two pixel values for each pixel pair of the compared images. If the object being inspected has turned out to be free of any defects based on the differential image, then since the image of the object is exactly the same as the image of the golden device, the differential image is an entirely flat image whose pixel values are "0" over the whole image. If the object being inspected has a defect or contains foreign matter, then pixels whose values are other than "0" collectively appear at the defect or foreign matter, and look like a particle. Those pixels whose values are other than "0" are gathered into a cluster (particle-like point), and the defect or foreign matter is detected by determining the size and center of the cluster.

The above defect detecting process, which has already been established in the art, is disadvantageous in that it is necessary to prepare the image of a golden device in advance. Generating the image of a golden device, i.e., the image of a defect-free device, requires that a defect-free sample be found first. Such a defect-free sample needs to be discovered carefully by the human eye. Since patterns for semiconductor wafers are available in a wide range and are being modified frequently due to recent trends toward the fabrication of many different types of semiconductor wafers in small quantities, it is necessary to generate golden device images respectively for all the different types and design modifications. The process of generating those golden device images is highly tedious and time-consuming. Furthermore, before the image of a golden device is actually compared with the image of an object to be inspected, the images need to be aligned accurately with each other. As a result, a considerable amount of pre-inspection processing which includes the generation of the images of golden devices and the accurate alignment of images to be compared has been required prior to the actual inspection process.

SUMMARY OF THE INVENTION

It is therefore an object of the present invention to provide a method of detecting a particle-like point in an image to detect a defect by directly processing an image to be inspected, without the need for pre-inspection processing such as the generation of the images of golden devices and the accurate alignment of images to be compared.

According to the present invention, an image of an object to be inspected is first binarized, and the binarized image is scanned along an X-axis or a Y-axis, and a particle-like point in the image is approximated by a rectangular area. Information representative of the coordinates of the center of the rectangular area and the size of the rectangular area is outputted as information of the detected particle-like point. The particle-like point can be detected without the need for pre-inspection processing such as the generation of images of golden devices and the accurate alignment of images to be compared.

In accordance with the present invention, there is provided a method of detecting a particle-like point in an image, comprising the steps of:

(a) binarizing an image with a predetermined threshold;

(b) scanning the binarized image in a first scanning direction parallel to an X-axis or a Y-axis, and detecting a pixel whose pixel value is 1 and which has not yet been registered as a particle-like point as a first pixel;

(c) scanning the binarized image from the first pixel in a second scanning direction perpendicular to the first scanning direction, detecting a pixel whose pixel value first becomes 0 as a second pixel, and if a pixel whose pixel value is 0 is not found and the binarized image has been scanned up to a frame thereof, detecting a pixel on the frame as a second pixel;

(d) scanning the binarized image in both of the scanning directions from a fifth pixel at a midpoint between the first pixel and the second pixel or a nearby point, on a straight line passing through the fifth pixel and parallel to the first scanning directions, and detecting pixels whose pixel values first become 0 as third and fourth pixels, and if a pixel whose pixel value is 1 is not found and the binarized image has been scanned up to a frame thereof, detecting pixels on the frame as third and fourth pixels, or scanning the binarized image on the straight line from a point spaced a predetermined distance from the fifth pixel in both of the scanning directions toward the fifth pixel, and detecting pixels whose pixel values first become 1 as third and fourth pixels, and if a point spaced the predetermined distance from the fifth pixel is not present in the binarized image, scanning the binarized image from a pixel at a point of intersection between the straight line and the frame of the binarized image toward the fifth pixel, and detecting pixels whose pixel values first become 1 as third and fourth pixels;

(e) outputting information representative of coordinates of a center of a rectangular area having the first, second, third, and fourth pixels on sides thereof and parallel to the X-axis and the Y-axis, setting the pixel values of all pixels in the rectangular area to 1, and registering all the pixels in the rectangular area as a particle-like point; and (i) repeating the steps (b), (c), (d), and (e) along the first and second scanning directions.

The distance may be a distance between the first pixel and the second pixel.

If the second pixel cannot be detected, the binarized image may be inverted about a straight line parallel to the first scanning direction, and the inverted binarized image may be scanned to detect a particle-like point.

The step (a) may comprise the steps of generating a two-dimensional circularly symmetrical FIR bandpass filter which is capable of separating an original image into a background and a particle-like point, determining a frequency response $H(\omega_1, \omega_2)$ of the generated two-dimensional circularly symmetrical FIR bandpass filter where $\omega_1, \omega_2$ represent frequency axes, respectively, in X and Y directions on a two-dimensional frequency plane, entering an image $x(i, j)$ where $(i, j)$ represent coordinates in a signal space, subjecting the image to two-dimensional Fourier transformation thereby to produce Fourier transform data $X(\omega_1, \omega_2)$, multiplying the frequency response $H(\omega_1, \omega_2)$ by the Fourier transform data $X(\omega_1, \omega_2)$ on a Fourier plane thereby produce a product $Y(\omega_1, \omega_2)$, subjecting the product $Y(\omega_1, \omega_2)$ to inverse Fourier transformation, producing inverse Fourier transform data, and binarizing the inverse Fourier transform data with the predetermined threshold.

The above and other objects, features, and advantages of the present invention will become apparent from the following description with references to the accompanying drawings which illustrate an example of the present invention.

DETAILED DESCRIPTION OF THE PREFERRED EMBODIMENT

Figure 1:
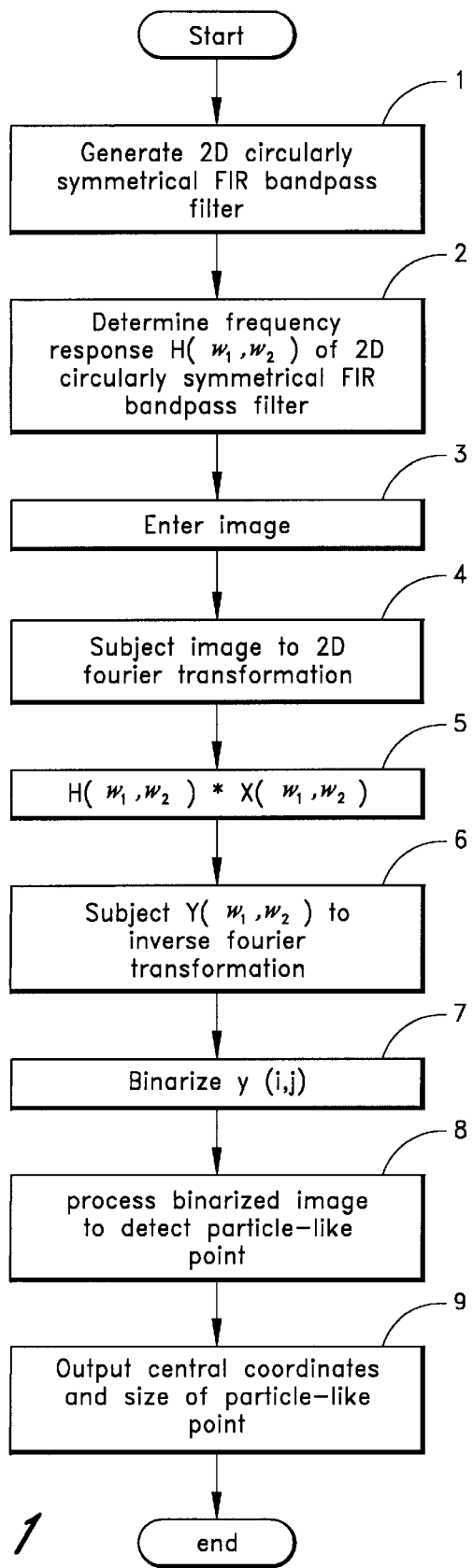
FIG. 1 is a flowchart of an operation sequence of a method of detecting a particle-like point in an image according to the present invention.

An operation sequence of a method of detecting a particle-like point in an image according to the present invention will be described below with reference to FIG. 1.

Figure 2:
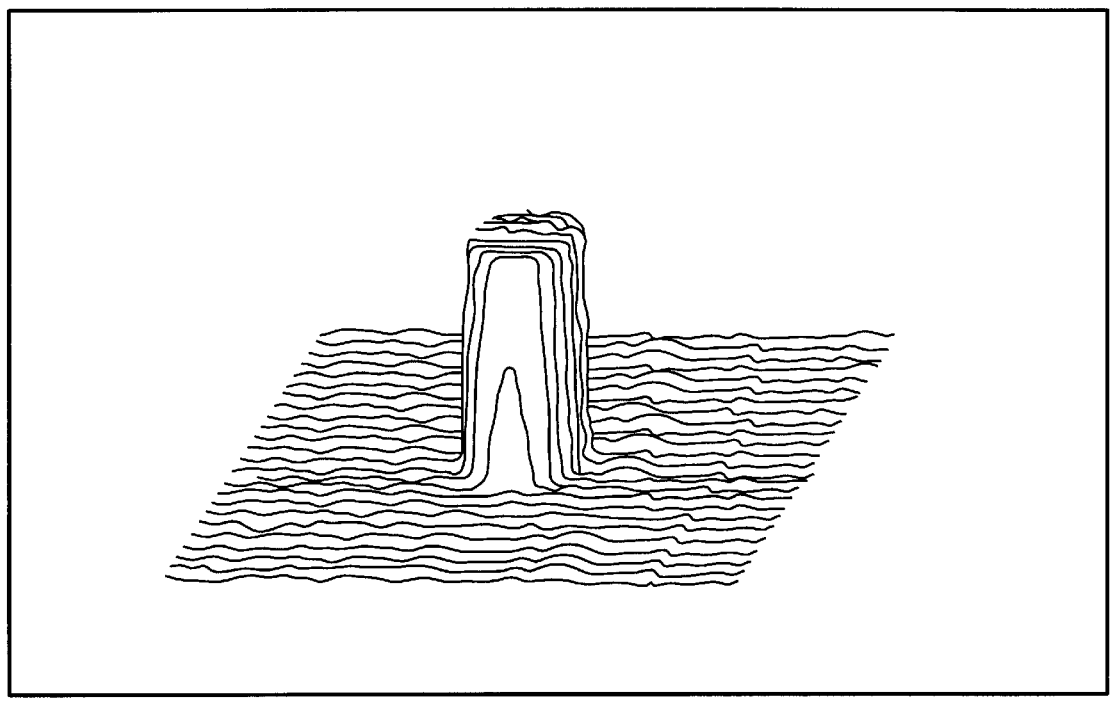
FIG. 2 is a diagram showing a two-dimensional circularly symmetrical FIR bandpass filter.

A two-dimensional circularly symmetrical FIR (Finite Impulse Response) bandpass filter which is capable of separating an original image into a background and a particle-like point as shown in FIG. 2 is generated in a step 1, and then a frequency response $H(\omega_1, \omega_2)$ of the generated two-dimensional circularly symmetrical FIR bandpass filter is determined in a step 2. The symbols $\omega_1, \omega_2$ of the frequency response $H(\omega_1, \omega_2)$ represent frequency axes, respectively, in X and Y directions on a two-dimensional frequency plane. The frequencies at positive- and negative-going edges of the passpand of the two-dimensional circularly symmetrical FIR bandpass filter are determined depending on the size of a particle-like point to be detected.

Then, an image $x(i, j)$ is entered in a step 3. The symbols $(i, j)$ of the image $x(i, j)$ represent coordinates in a signal space.

Thereafter, the image is subjected to two-dimensional Fourier transformation, producing Fourier transform data $X(\omega_1, \omega_2)$ in a step 4.

The frequency response $H(\omega_1, \omega_2)$ is multiplied by the Fourier transform data $X(\omega_1, \omega_2)$ on a Fourier plane according to the following equation in a step 5:

$$Y(\omega_1, \omega_2) = H(\omega_1, \omega_2) \times X(\omega_1, \omega_2).$$

Then, the product $Y(\omega_1, \omega_2)$ is subjected to inverse Fourier transformation, producing inverse Fourier transform data $y(i, j)$ in a step 6.

The inverse Fourier transform data $y(i, j)$ is binarized in a step 7. A binarized image generated as a result of the binarization is referred to as bina $(i, j)$.

The binarized image bina $(i, j)$ is then subjected to a particle-like point detection subroutine to detect a particle-like point in a step 8. Then, the coordinates of the center of the particle-like point, and the radius and size of the particle-like point are outputted in a step 9.

The original image data is Fourier-transformed, the frequency response of the bandpass filter is multiplied by the Fourier transform data, and the product is inverse-Fourier-transformed because it is faster to effect filtering in the frequency space. Since the data is simply multiplied by "0" in the stopband, the filtering can be carried out simply and at high speed. If the same bandpass filter were used in the signal space, each pixel would need to be multiplied by a different value, resulting in a complex process.

Figure 3:
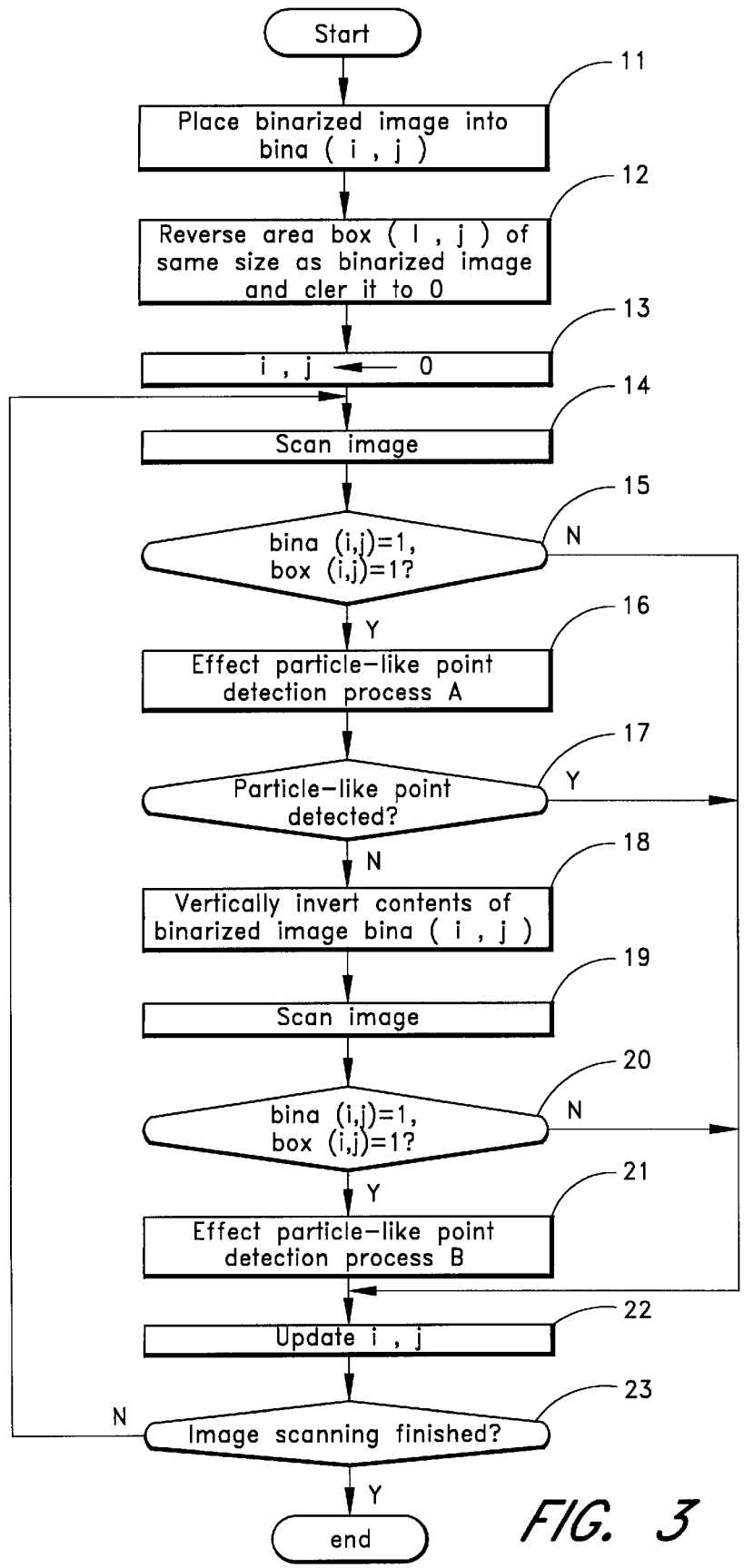
FIG. 3 is a flowchart of an operation sequence of a particle-like point detection subroutine in the operation sequence shown in FIG. 1.

The particle-like point detection subroutine in the step 8 will be described in detail with reference to FIG. 3.

Figure 4A:
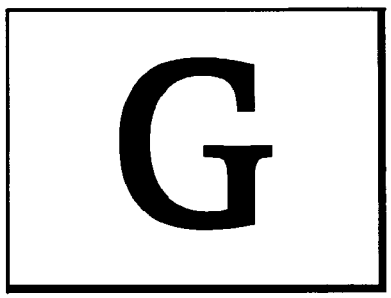
FIGS. 4A and 4B are views showing a binary image and an inverted image thereof, respectively.
Figure 4B:
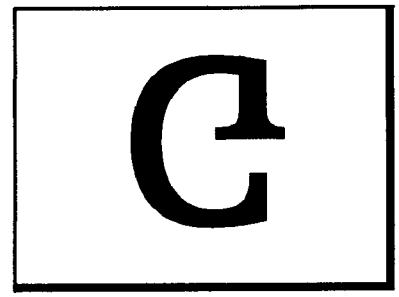
Figure 5:
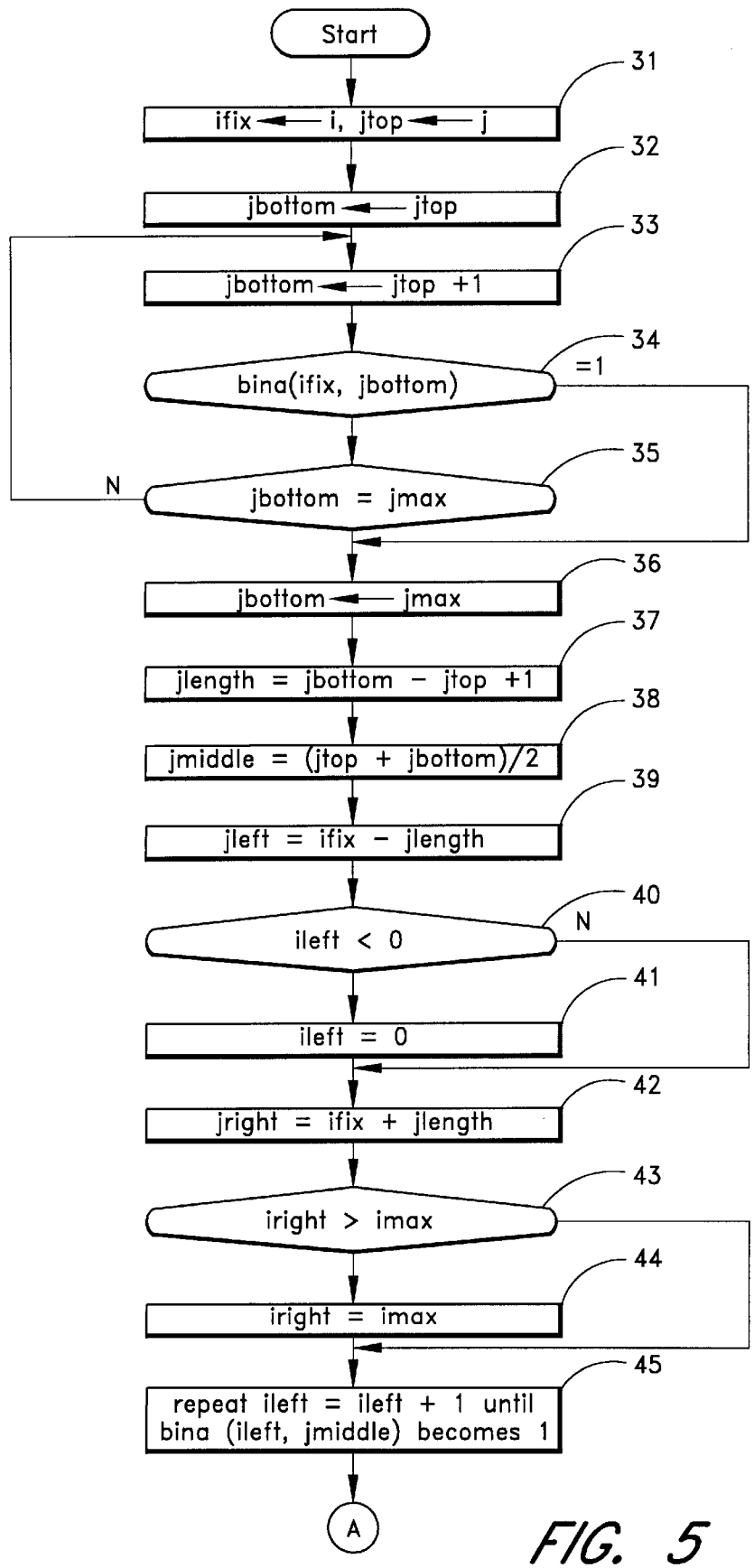
FIGS. 5 and 6 are a flowchart of an operation sequence of a particle-like point detection process in the operation sequence shown in FIG. 3.
Figure 6:
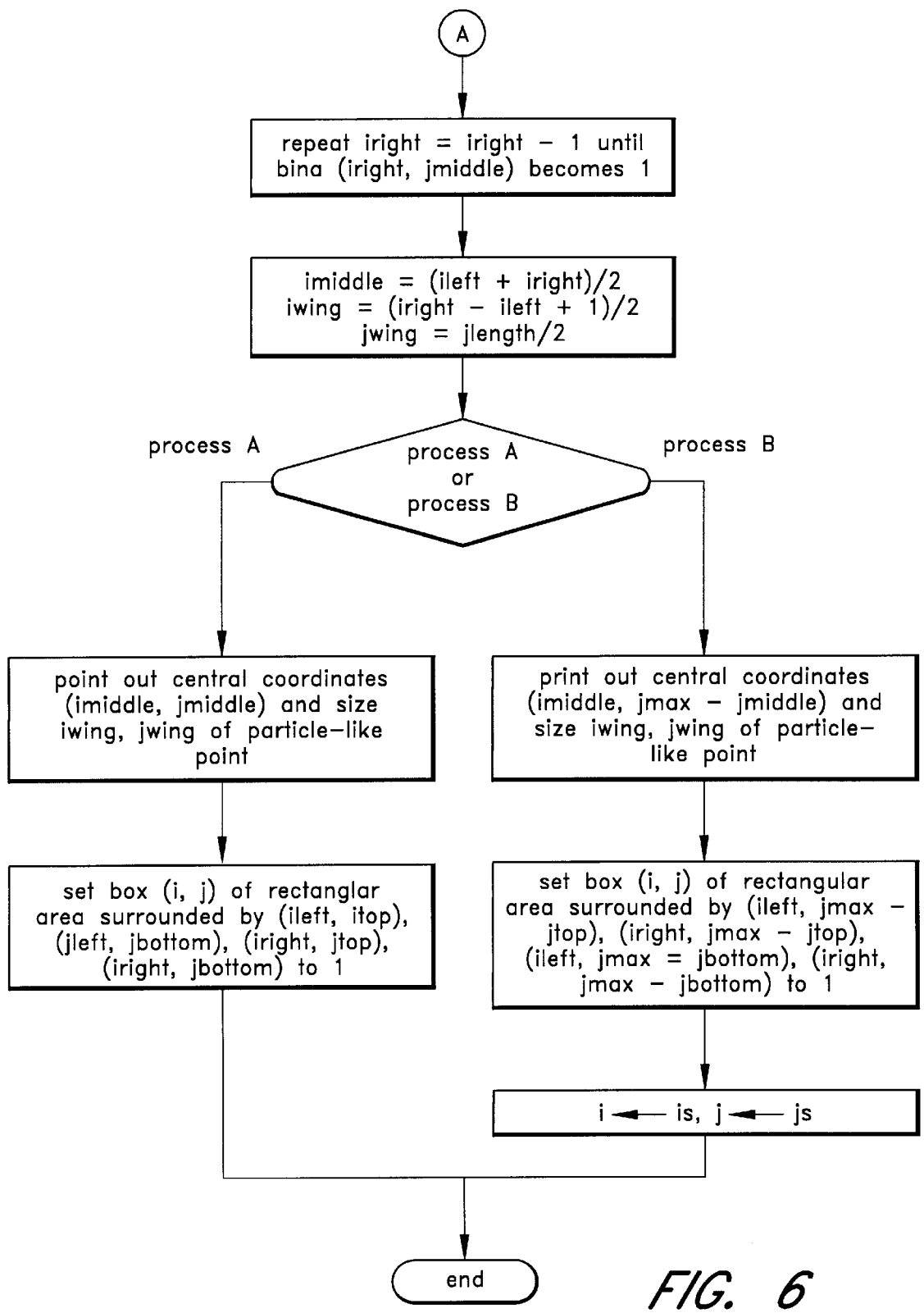
Figure 7:
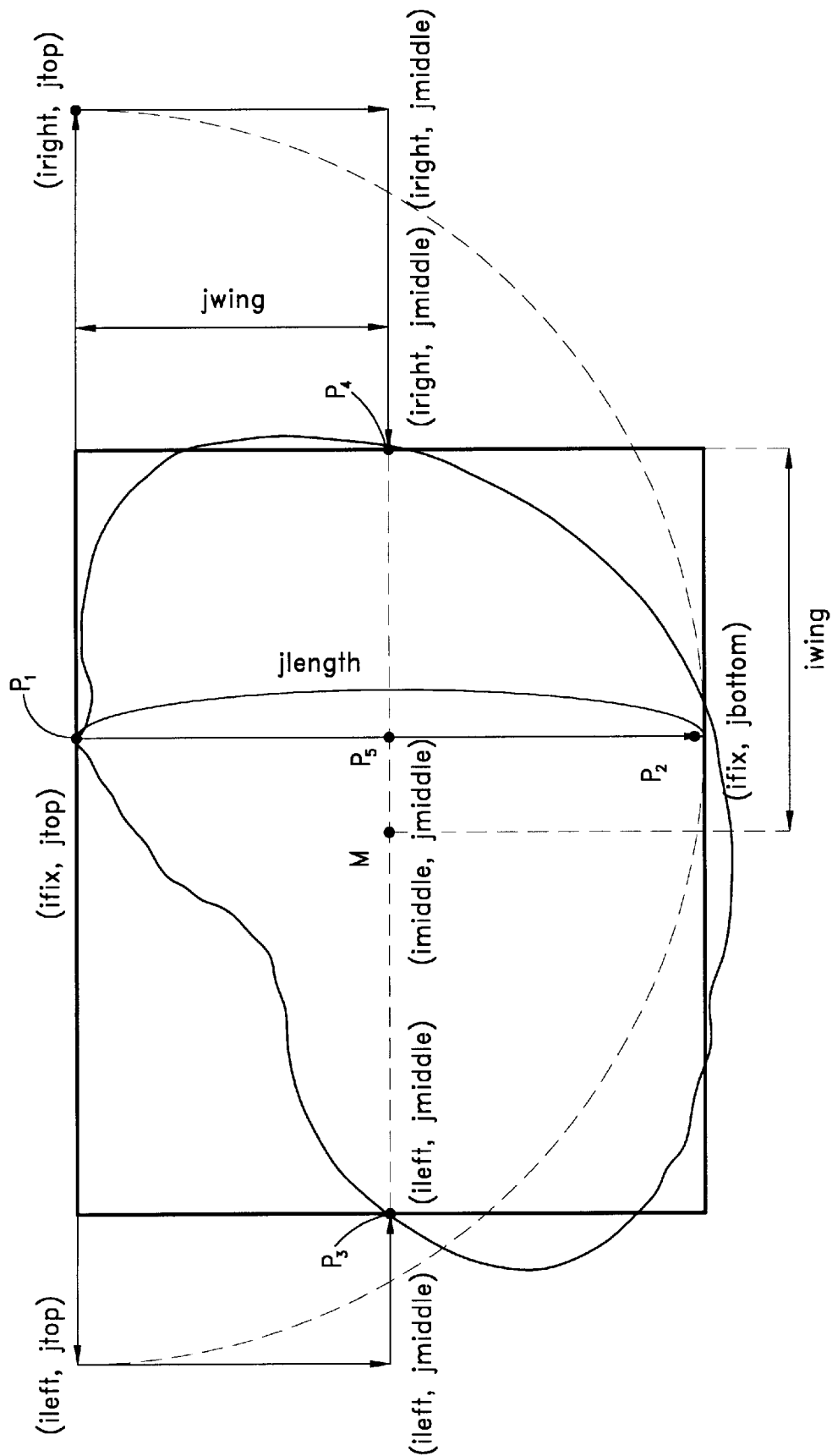
FIG. 7 is a diagram illustrative of the particle-like point detection process.

First, the binary image is placed into bina $(i, j)$ in a step 11. Then, an area box $(i, j)$ which is of the same size as the binary image is reserved, and cleared to box $(i, j)=0$ in a step 12. The variables $i, j$ in box $(i, j)$ are set to $i=0, j=0$ in a step 13, and the image starts being scanned from its first line in a step 14. It is determined whether bina $(i, j)$ is 1 and box $(i, j)$ is not 1 in a step 15. If bina $(i, j)$ is 1 and box $(i, j)$ is not 1, i.e., if a pixel value is 1 and has not yet been registered as a particle-like point, then a particle-like point detection process is carried out in a step 16. In a next step, it is determined whether a particle-like point has been determined or not. If a particle-like point has been determined, then the variables $i, j$ are updated in a step 22, and control proceeds to the processing of a next pixel. If a particle-like point has not been determined, then the binarized image bina $(i, j)$ is inverted symmetrically about a straight line parallel to the X-axis in a step 18. The inversion of the binarized image bina $(i, j)$ means converting an image "G" shown in FIG. 4A into an inverted image "G" shown in FIG. 4B, for example. In this embodiment, the binarized image bina $(i, j)$ is inverted symmetrically about a straight line represented by $j=jmax/2$, with the variables $i, j$ being saved to is, js, respectively, and the Y coordinates of the binarized image bina $(i, j)$ being all set to $jmax-j$. Then, steps 19, 20, 21 which are identical respectively to the steps 14, 15, 16 are carried out. Thereafter, the variables $i, j$ are updated in the step 22, followed by a step 23 which determines whether the scanning of all the image is finished or not. If not finished, then control returns to the step 14.

The particle-like point detection process in each of the steps 16, 21 will be described below with reference to FIGS. 5, 6, 7, 8A, and 8B.

The variables i, j are set to X and Y coordinates ifix, itop, respectively, of a first pixel P1 in a step 31. An initial value of jbottom is set to jtop in a step 32, and jbottom is incremented by 1 until bina (ifix, jbottom) first becomes 0 in steps 33~35. If a pixel whose pixel value is 1 is not found even when jbottom is equal to jmax, i.e., even when the final line of the Y-axis is reached, then jbottom is set to jbottom=jmax in steps 35, 36. In this manner, coordinates (ifix, jbottom) of a second pixel P2 are determined. Then, a length jlength=jbottom−jtop+1 in the Y-axis direction of a particle-like point and a Y coordinate jmiddle=(jtop+jbottom)/2 of a midpoint M of the particle-like point are calculated in steps 37, 38. Then, ileft=ifix+jlength is calculated in a step 39. If ileft is negative, then ileft is set to ileft=0 in steps 40, 41. Thereafter, iright=ifix+jlength is calculated in a step 42. If iright exceeds imax (maximum coordinate on the X axis), then iright is set to iright=imax in steps 43, 44. Then, ileft is incremented by 1 until bina (ileft, jmiddle) first becomes 1 in a step 45, and iright is decremented by 1 until bina (iright, jmiddle) first becomes 1 in a step 46. In this manner, coordinates (ileft, jmiddle), (iright, jmiddle) of third and fourth pixels $P_3$, $P_4$ are determined. An X coordinate imiddle=(ileft+iright)/2 of the midpoint M of the particle-like point, and a size iwing=(iright−ileft+1)/2, jwing=jlength/2 of the particle-like point is determined in a step 47. According to the particle-like point detection process (process A) in the step 16, as determined in a step 48, the central coordinates (imiddle, jmiddle) of the particle-like point and the size iwing, jwing of the particle-like point are outputted in a step 49, and box (i, j) of a rectangular area surrounded by coordinates (ileft, jtop), (ileft, jbottom), (iright, jtop), (iright, jbottom) is set to 1, and registered as a particle-like point in a step 50. According to the particle-like point detection process (process B) in the step 21, as determined in the step 48, the central coordinates (imiddle, jmax−jmiddle) of the particle-like point and the size iwing, jwing of the particle-like point are outputted in a step 51, and box (i, j) of a rectangular area surrounded by coordinates (ileft, jmax−jtop), (iright, jmax−jtop), (ileft, jmax−jbottom), (iright, jmax−jbottom) is set to 1, and registered as a particle-like point in a step 52. Finally, the values of i, j are reset to the values of is, js prior to the inversion of the image in a step 53.

Figure 8A:
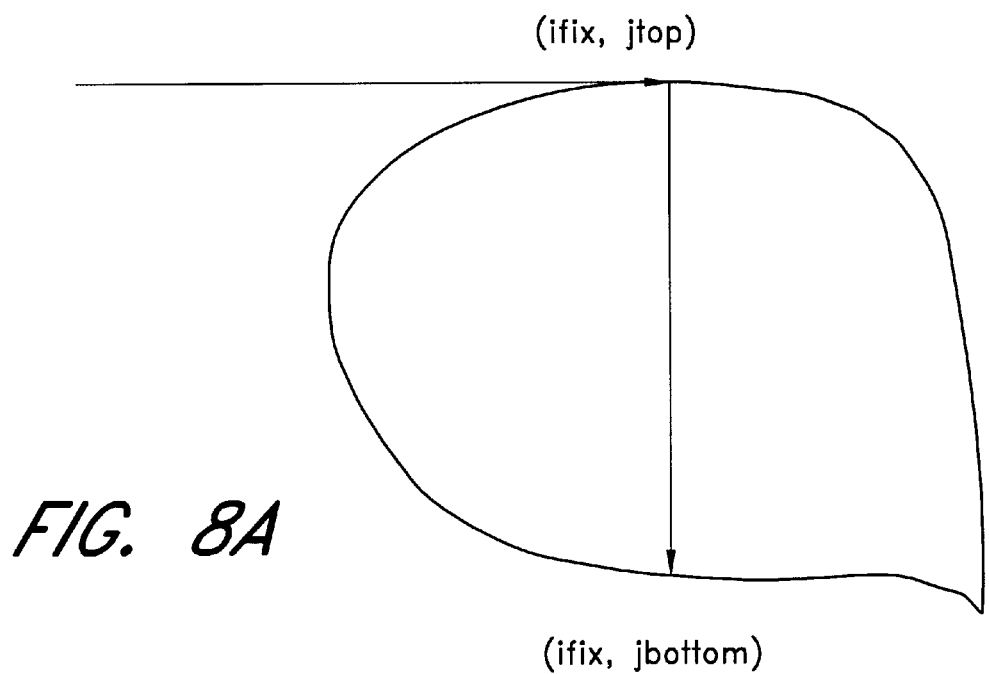
FIGS. 8A and 8B are diagrams showing particle-like points by way of example.
Figure 8B:
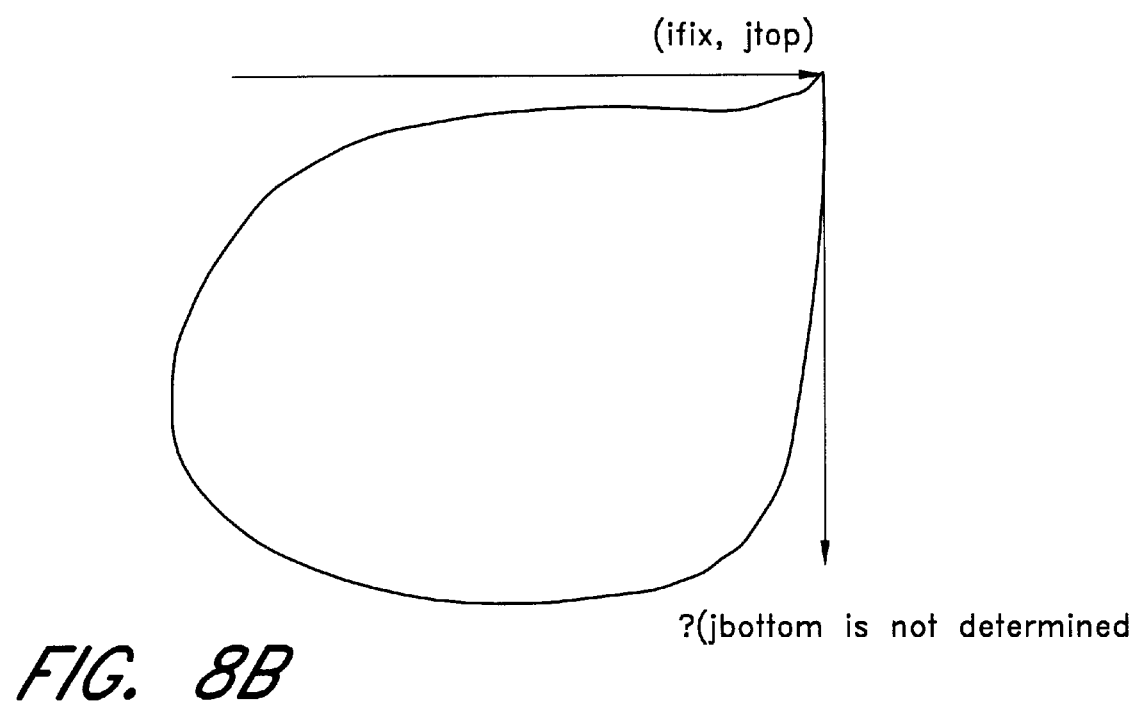

If the particle-like point is shaped as shown in FIG. 8A, then the Y coordinate jbottom can be determined of necessity. However, if the particle-like point is shaped as shown in FIG. 8B, then the Y coordinate jbottom cannot be determined. To avoid such a drawback, the binarized image is inverted in the step 18 to detect a particle-like point.

It is of course possible to detect a particle-like point by scanning an image from the last line, not the first line. If a Y coordinate jbottom cannot be determined, then the image may be scanned from the last line thereof. Either one of iwing, jwing may be outputted as indicating the size of a particle-like point. The binarized image bina (i, j) may be scanned parallel to the X axis from a pixel $P_5$ at the midpoint between the first and second pixels $P_1$, $P_2$ or a nearby pixel, and points where pixel values first change to 0 may be regarded as the third and fourth pixels $P_3$, $P_4$. Alternatively, the binarized image bina (i, j) may be scanned not from the pixel $P_5$, but from a pixel that is spaced a certain distance other than jlength from a point in the vicinity of the pixel $P_5$. The binarized image may further alternatively be scanned from a first or last column to a last or first column.

While a preferred embodiment of the present invention has been described using specific terms, such description is for illustrative purposes only, and it is to be understood that changes and variations may be made without departing from the spirit or scope of the following claims.

What is claimed is:

1. A method of detecting a particle-like point in an image, comprising the steps of:

(a) binarizing an image with a predetermined threshold;

(b) scanning the binarized image in a first scanning direction parallel to an X-axis or a Y-axis, and detecting a pixel whose pixel value is 1 and which has not yet been registered as a particle-like point as a first pixel;

(c) scanning the binarized image from said first pixel in a second scanning direction perpendicular to said first scanning direction, detecting a pixel whose pixel value first becomes 0 as a second pixel, and if a pixel whose pixel value is 0 is not found and said binarized image has been scanned up to a frame thereof, detecting a pixel on said frame as a second pixel;

(d) scanning said binarized image in both of the scanning directions from a fifth pixel at a midpoint between said first pixel and said second pixel or a nearby point, on a straight line passing through said fifth pixel and parallel to said first scanning directions, and detecting pixels whose pixel values first become 0 as third and fourth pixels, and if a pixel whose pixel value is 0 is not found and said binarized image has been scanned up to a frame thereof, detecting pixels on said frame as third and fourth pixels, or scanning said binarized image on said straight line from a point spaced a predetermined distance from said fifth pixel in both of the scanning directions toward said fifth pixel, and detecting pixels whose pixel values first become 1 as third and fourth pixels, and if a point spaced said predetermined distance from said fifth pixel is not present in said binarized image, scanning said binarized image from a pixel at a point of intersection between said straight line and the frame of the binarized image toward said fifth pixel, and detecting pixels whose pixel values first become 1 as third and fourth pixels;

(e) outputting information representative of coordinates of a center of a rectangular area having said first, second, third, and fourth pixels on sides thereof and parallel to the X-axis and the Y-axis, setting the pixel values of all pixels in said rectangular area to 1, and registering all the pixels in said rectangular area as a particle-like point; and (i) repeating said steps (b), (c), (d), and (e) along said first and second scanning directions.

2. A method according to claim 1, wherein said predetermined distance is a distance between said first pixel and said second pixel.

3. A method according to claim 1, wherein if said second pixel cannot be detected, said binarized image is inverted about a straight line parallel to said first scanning direction, and the inverted binarized image is scanned to detect a particle-like point.

4. A method according to claim 1, wherein said step (a) comprises the steps of:

generating a two-dimensional circularly symmetrical FIR bandpass filter which is capable of separating an original image into a background and a particle-like point;

determining a frequency response H ($\omega_1$, $\omega_2$) of the generated two-dimensional circularly symmetrical FIR bandpass filter where $\omega_1$, $\omega_2$ represent frequency axes, respectively, in X and Y directions on a two-dimensional frequency plane;

entering an image x (i, j) where (i, j) represent coordinates in a signal space;

subjecting the image to two-dimensional Fourier transformation thereby to produce Fourier transform data X ($\omega_1$, $\omega_2$);

multiplying said frequency response H ($\omega_1$, $\omega_2$) by said Fourier transform data X ($\omega_1$, $\omega_2$) on a Fourier plane thereby to produce a product Y ($\omega_1$, $\omega_2$);

subjecting said product Y ($\omega_1$, $\omega_2$) to inverse Fourier transformation, producing inverse Fourier transform data; and binarizing said inverse Fourier transform data with said predetermined threshold.

* * * * *